Oct. 13, 1959     E. W. PITZER     2,908,881

ELECTRICAL TRANSDUCER

Filed Jan. 6, 1958     2 Sheets-Sheet 1

INVENTOR.
EDMUND W. PITZER
BY
Christie, Parker & Hale
ATTORNEYS

Oct. 13, 1959  E. W. PITZER  2,908,881
ELECTRICAL TRANSDUCER

Filed Jan. 6, 1958

INVENTOR.
EDMUND W. PITZER
BY
Christie, Parker & Hale
ATTORNEYS

United States Patent Office 2,908,881
Patented Oct. 13, 1959

2,908,881

ELECTRICAL TRANSDUCER

Edmund W. Pitzer, Monrovia, Calif., assignor to Edcliff Instruments, Inc., Monrovia, Calif., a corporation of California Application January 6, 1958, Serial No. 707,417

12 Claims. (Cl. 338—40)

This invention relates to transducer and particularly to a pressure transducer relatively insensitive to environmental shock, vibration and acceleration.

For numerous applications the utilization of transducers in the measurement of pressure requires that the measurement be free from inaccuracies introduced by vibration, shock and acceleration. The use of pressure transducers as components of control systems for aircraft and missiles makes the characteristic of insensitivity to spurious responses particularly necessary. In addition, the maximum possible accuracy and sensitivity is required for control applications.

The present invention provides a pressure transducer having exceptional characteristics of accuracy and sensitivity. In addition, the linkage between the pressure responsive system and the displacement sensing system is direct and supported so as to be substantially free from shock, vibration and acceleration. In the present invention the transducer comprises a base and a tube formed in a flat spiral having a plurality of turns. One end of the tube is rigidly attached to the base. The other end of the tube is free to move responsive to variations in the pressure differential between the exterior and interior of the tube. The free end of the tube is joined to a motion-transmitting means. The motion-transmitting means is, in turn, joined to an electrical displacement-sensing means.

As compared, for example, to the use of a so-called "C-type" tube, the use of a tube formed into a flat spiral as the pressure responsive means results in improved accuracy and sensitivity. This is because the longer length of the tube in the flat spiral, compactly formed without the necessity for increased envelope dimensions, produces a large displacement responsive to each increment of pressure change. In addition, no need for amplification of tube movement is required so that the use of movement-magnifying means, with consequent introduction of friction and back-lash errors, is avoided. When, for example, a shaft journaled at one end into the base is used as the means for transmitting the movements of the free end of the tube to the displacement sensing means, a direct linkage is provided. In this manner, since both the pressure responsive tube and the displacement sensing means, such as the contact arm of a potentiometric system, are fully supported, spurious responses due to environmental shock, vibration, or acceleration are avoided.

The pressure transducer according to the invention is particularly adapted to the use of a potentiometric system as the electrical displacement-sensing means. Single or multiple potentiometer elements may be directly linked to the pressure responsive system.

The apparatus according to the invention and its method of operation will be more clearly understood from the following description taken in conjunction with the accompanying drawings, in which.

Figure 2:
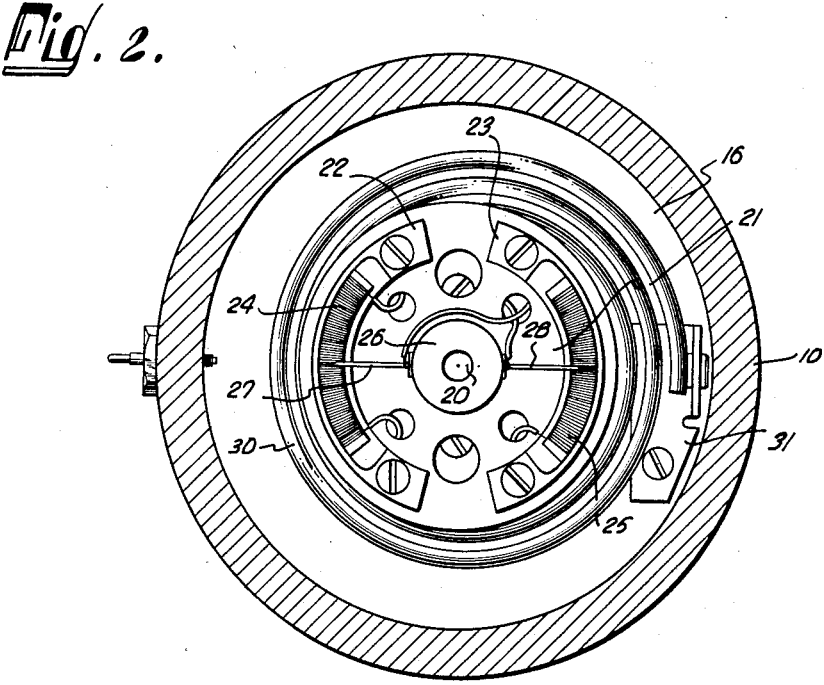
Fig. 2 is a view taken along broken lines 2—2 of Fig. 1.
Figure 1:
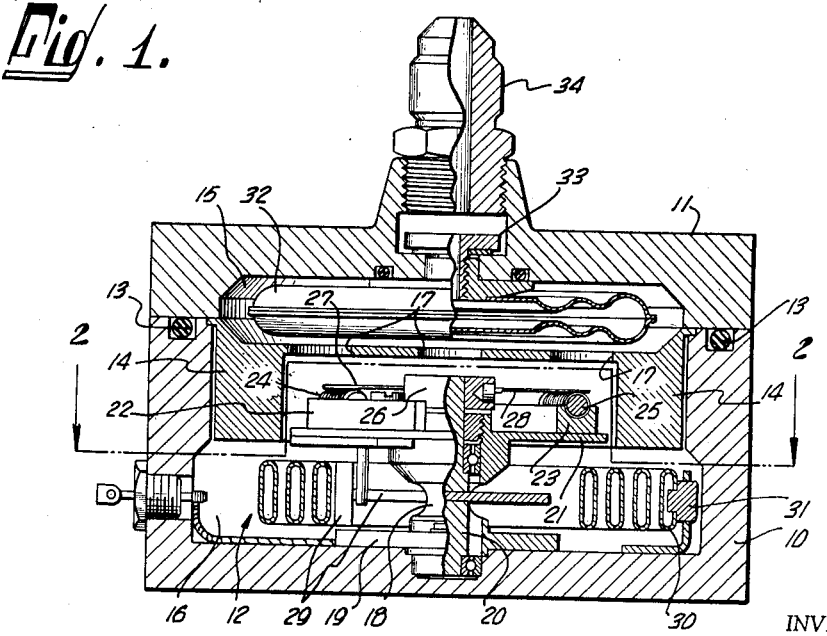
Fig. 1 is an elevational view, partially sectioned, of a preferred embodiment of the transducer according to the invention.

With reference to Figs. 1 and 2, a base 10 is joined to a cap cover 11 to form an enclosure 12 made fluid tight through the use of an O ring 13 as a sealing means. In order to reduce the amount of damping liquid necessary to fill the enclosure and thereby to reduce the temperature sensitivity of the structure, a fluid displacement ring 14 is supported within the enclosure by a shoulder formed in the base where it is joined to the cap cover. The fluid displacement ring is a metal piece shaped to occupy the maximum possible volume in the enclosure without interfering with the operative elements. In the preferred embodiment a portion of the ring divides the enclosure into a capsule chamber 15 and a main chamber 16. Fluid communication between the two chambers is provided by ports 17 in the fluid displacement ring.

A hollow supporting structure 18 is joined by a base plate 19 to the bottom interior of the base so as to vertically project into the main chamber. A shaft 20 supported near its upper end by an interior bearing surface within the supporting structure is journaled into the base at its other end. Therefore, the shaft, while firmly supported, remains free to rotate within the supporting structure. An annular plate 21 is peripherally joined to the upper portion of the supporting structure. The top of the shaft projects above the annular plate. On opposite sides of the shaft two semi-circular bridges 22 and 23 are fixed to the annular plate. Within a groove in each of the bridges, arcuate resistance wire coils 24 and 25, elements of the displacement-sensing potentiometric system, are placed. A rotatable element 26 is joined to the top of the shaft so as to rotate responsive to rotary motions of the shaft. From opposite sides of the rotatable element two contact arms 27 and 28 project and are maintained in slidable contact with the resistance wire coils. In this manner a rotational movement of the shaft produces a corresponding movement of the contact arms and responsive displacement of the contact arms along the respective resistance wire coils. Electrical connections (not shown) to the contact arms and resistance wire coils are provided to complete the potentiometric system.

A key 29 is fitted through the shaft transverse to its longitudinal axis so that movements of the key produce a rotary motion of the shaft. The key passes through a lower portion of the supporting structure which is slotted sufficiently to permit rotary motion of the key.

A tube 30 formed in a flat spiral having a plurality of turns, constituting the pressure responsive means, is located on the base concentrically with respect to the supporting structure. The flat spiral is formed from a thin-walled tube which has been flattened on diametrically opposite sides so as to give an approximately elliptical cross section to the tube. The outer end of the spiral is fixed to a bracket 31 which is rigidly attached to the base. The inner end of the spiral is fixed to the key, and is called the "free" end since a pressure change produces movement of this end of the tube. The inside of the tube is evacuated and both ends of the tube are sealed so that the interior of the tube is isolated from its exterior surrounding.

A pressure capsule 32 is centrally disposed in the capsule chamber. The pressure capsule is a hollow element formed from a material deformable upon the application of pressure. The interior of the capsule is joined to an external source of pressure by a bushing 33 and a pressure fitting 34. The interior of the capsule is therefore separated from the damping liquid within the main enclosure, so that a means of isolating the fluid being tested from the operative elements is provided.

The pressure transducer as described in connection with Fig. 1 is fitted for the measurement of absolute pressure. The external source of pressure is connected to the interior of the pressure capsule. Since the enclosure within the transducer is filled with an incompressible fluid, the pressure applied within the interior of the capsule is uniformly transmitted throughout the enclosure. Accordingly, the external source of pressure is exerted against the exterior of the flat spiral tube, which has an evacuated interior.

It is apparent that with slight modifications the pressure transducer described may be adapted for the measurement of gage or differential pressures. For the measurement of differential pressures the interior of the spiral tube is joined by a suitable pressure fitting to a second source of pressures. As one example of its use for the measurement of gage pressures, the interior of the tube may be joined to the varying source of pressure to be measured while the interior of the pressure capsule is vented to the atmosphere. A converse arrangement may also be utilized for the measurement of gage pressures.

In operation, the effect of a change in the pressure differential between the interior and exterior of the tube is to cause a movement of the free end of the tube. In effect, the flat spiral arrangement gives a summation of the end movements of a large number of small tubes. Accordingly, a large movement of the free end occurs responsive to a given increment of pressure change. The movement of the free end of the tube exerts a turning force against the key with a consequent rotational movement of the shaft. The rotary movement of the shaft effects a displacement of the contact arms along the resistance wire coils of the potentiometric system. It is readily apparent that translation of the movement of the pressure sensitive tube to the resistance wire coils is done directly without the necessity for mechanical linkages giving high inertia to the system.

While the pressure transducer according to the invention has been described with the use of a potentiometric system for the sensing of the displacement of the spiral tube, it is readily apparent that it can be adapted for use with other electrical pick-offs. For example, movement of the free end of the tube may be translated so as to cause an increase or decrease in the tension of strain sensitive wires. An electrical signal responsive to the magnitude of the change in tension of the wires would be obtained corresponding to the magnitude of the pressure change involved. Similarly, an electrical inductance type pick-off could be used to sense displacement of the free end of the spiral tube. The transducer according to the invention is readily adaptable to such modifications, and such changes in no way affect the basic concept of the invention.

The use of a pressure capsule in the transducer according to the invention serves to isolate the measured fluid from the interior operative elements of the transducer. This advantage is particularly important where the measured fluid possesses corrosive characteristics. It is readily apparent that other means may be substituted for the pressure capsule without affecting the effectiveness of the transducer. For example, a slack diaphragm may be inserted so as to form a first chamber in which the measured fluid is contained and a second chamber in which the operative elements are contained. Similarly, a metal diaphragm forming two chambers may be employed.

The preferred embodiment of the invention may also be modified so that the contact arms are supported in a fixed position on the annular plate while the resistance wire coils are joined to the shaft. In such an embodiment the resistance wire coils would rotate responsive to movements of the shaft while the contact arms remained fixed. In the same manner, as where the positions are reversed, the electrical response would vary proportional to the displacement of the shaft responsive to movements of the free end of the spiral.

Figure 3:
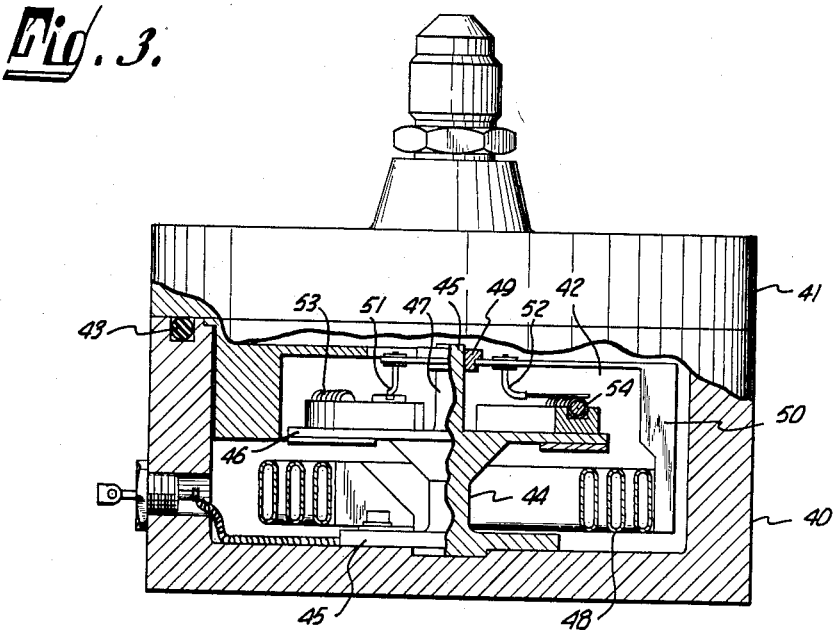
Fig. 3 is an elevational view, partially sectioned, of another embodiment of the transducer according to the invention.

With reference to Fig. 3 another embodiment of the transducer according to the invention is shown in an elevation view partially sectioned. The operative characteristics of this embodiment are the same as those described in connection with Figs. 1 and 2. As in the case of Fig. 1, a base 40 joined to a cap section 41 forms an enclosure 42 made fluid tight by an O ring 43. A central supporting structure 44 is rigidly joined by a base plate 45 to the bottom interior of the base. An annular plate 46 is peripherally joined to the upper portion of the supporting structure. A fixed cylindrical element 47 protrudes from the upper portion of the supporting structure. A tube 48 formed in a flat spiral having a plurality of turns is placed concentrically with respect to the supporting structure. In this embodiment, however, the inner spiral end of the tube is fixed to the rigid supporting structure while the outer spiral end of the tube is free to move. A rotatable element 49 is joined to the top of the cylindrical element and is engaged by a bracket 50 with the outer end of the flat spiral. Contact arms 51 and 52 are joined to the rotatable element at one end and maintained in slidable contact with resistance wire coils 53 and 54 supported by the annular plate. In this manner movements of the outer spiral end of the tube responsive to pressure variations produce a rotary motion of the rotatable element and consequent displacement of the contact arms along their respective resistance wire coil. Although not shown, pressure is applied to the capsule in the same manner as described in conjunction with Figs. 1 and 2.

While the transducer according to the invention has been described for the use of two resistance wire coils and contact arms, it is readily apparent that the transducer may be modified so that one or more than two contact arms and resistance wire coils may be utilized. Where, for example, a single resistance wire coil and contact arm is employed, the supporting structure may be modified so that it acts as a fluid displacement member in addition.

Figure 4:
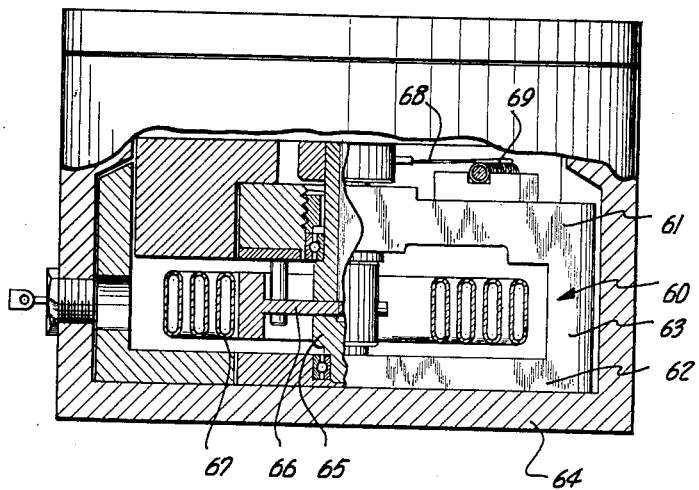
Fig. 4 is an elevational view, partially sectioned, of yet another embodiment of the transducer according to the invention.

With reference to Fig. 4 an embodiment of the transducer according to the invention is shown in which a supporting structure 60 comprises two horizontal parallel members 61 and 62 joined by a vertical member 63. The lower horizontal member is rigidly joined to a base 64. A shaft 65, joined by a key 66 to the inner free end of a tube 67 formed in a flat spiral, is journaled at one end into the lower horizontal member of the supporting structure, and is rotatably supported in passing through the upper horizontal member of the supporting structure. The outer spiral end of the tube is rigidly joined to the vertical member of the supporting structure. In this embodiment, a single contact arm 68 joined to the upper end of the shaft is maintained in slidable contact with a resistance wire coil 69 suported on the upper horizontal member. The operative characteristics of this embodiment are, except as previously described, the same as those described in conjunction with Figs. 1 and 2. In this embodiment of the transducer according to the invention the volume of damping liquid necessary to fill the enclosure is reduced by the volume of the supporting structure.

To compensate for changes in temperature of the damping fluid with consequent changes of the pressure within the enclosure, the contact arms in the embodiments previously described may be joined to the shaft through a bimetallic strip. In this manner changes in temperature produce a movement of the bimetallic strip adjusted so that such movements re-zero the contact arm on the resistance wire coils. A zero pressure reading is therefore obtainable even though changes in pressure occur within the enclosure as a result of expansion and contraction of the contained incompressible damping fluid.

The pressure transducer according to the invention achieves greater sensitivity and accuracy, temperature stability and resistance to environmental shock, vibration and acceleration by reason of its unique combination of a pressure sensing element in the form of a flat spiral and a potentiometric system. The use of a flat spiral introduces a greater tube length so that there is no necessity for compromising elastic properties of the tube by choosing a low modulus alloy. In addition, since only the free end of the tube and the attached wiper rotate, the loaction of the element is independent of tube properties or exact geometry. The ease with which the transducer according to the invention is assembled and calibrated to provide a zero pressure reading makes it particularly adaptable to a wide number of uses. This factor combined with its improved operating characteristics introduces a substantial improvement in pressure measurements.

I claim:

1. A pressure transducer comprising a base, a pressure-responsive tube formed in a flat spiral having a plurality of turns, the inner spiral end of the tube being rigidly attached to the base and the outer spiral end of the tube being movable in a generally circular direction around the axis of the spiral responsive to variations in the pressure differential between the interior and exterior of the tube, supporting means rigidly joined to the base at one end and having a cylindrical element at the other end, a rotatable element rotatably supported on the cylindrical element, means joining the outer end of the tube and the rotatable element whereby pressure responsive movements of the tube are translated into rotary motion of the rotatable element, a resistance wire coil supported on the supporting means, and a contact arm joined to the rotatable element and constructed to move in slidable contact along the resistance wire coil responsible to rotary movement of the rotatable element.

2. A pressure transducer comprising a base, a pressure-responsive tube formed in a flat spiral having a plurality of turns, one end of the tube being rigidly attached to the base and the other end of the tube being free to move responsive to variations in the pressure differential between the interior and exterior of the tube, a shaft centrally journaled at one end into the base and joined to the free end of the tube whereby pressure responsive movements of the tube are translated into rotary motion of the shaft, supporting means rigidly joined to the base and constructed to provide bearing support for a portion of the other end of the shaft, a plurality of resistance wire coils held on the supporting means, and an equal plurality of contact arms joined to the other end of the shaft, each contact arm arranged to move in slidable contact along a corresponding resistance wire coil responsive to rotary motion of the shaft.

3. Apparatus in accordance with claim 2 wherein two resistance wire coils are supported on opposite sides of the supporting means and two contact arms are joined to opposite sides of the other end of the shaft, each contact arm arranged to move in slidable contact along a resistance wire coil responsive to rotary motion of the shaft.

4. A pressure transducer comprising a base, a housing joined to the base to form a fluid-tight first enclosure, a rotatable shaft supported on the base, a pressure-responsive tube formed in a flat spiral having a plurality of turns disposed concentrically around the shaft, the outer end of the tube being rigidly joined to the base and the inner end of the tube being joined to the rotatable shaft whereby movements of the inner end of the tube responsive to pressure variations produce rotary motion of the shaft, displacement-sensing means operatively adapted to the shaft to sense rotary motion of the shaft, a substantially incompressible fluid filling the first enclosure and immersing the pressure-responsive tube, and a deformable membrane forming a second enclosure sealed from the fluid within the first enclosure and connected to a source of pressure.

5. Apparatus in accordance with claim 2 wherein the interior of the tube is evacuated.

6. Apparatus in accordance with claim 2 wherein the interior of the tube is connected to the atmosphere.

7. Apparatus in accordance with claim 2 wherein the interior of the tube is connected to a source of pressure different from that connected to the second enclosure.

8. A pressure transducer comprising a base, a pressure-responsive tube formed in a flat spiral having a plurality of turns, one end of the tube being rigidly attached to the base and the other end of the tube being free to move responsive to variations in the pressure differential between the interior and exterior of the tube, a shaft centrally journaled at one end into the base and joined to the free end of the tube whereby pressure responsive movements of the tube are translated into rotary motion of the shaft, supporting means rigidly joined to the base and constructed to provide bearing support for a portion of the other end of the shaft, a resistance wire coil supported on the supporting means, a contact arm joined to the other end of the shaft and arranged to move in slidable contact along the resistance wire coil responsive to rotary motion of the shaft, and temperature sensitive means adapted to adjust the position of the contact arm on the resistance wire coil a predetermined distance responsive to increments of temperature change.

9. Apparatus in accordance with claim 8 wherein the temperature sensitive means is a bimetallic strip.

10. A pressure transducer comprising a base, a rotatable shaft supported on the base, a pressure-responsive tube formed in a flat spiral having a plurality of turns disposed concentrically around the shaft, the outer end of the tube being rigidly joined to the base and the inner end of the tube being joined to the rotatable shaft whereby movements of the inner end of the tube responsive to pressure variations produce rotary motion of the shaft, and displacement-sensing means operatively adapted to the shaft to sense rotary motion of the shaft.

11. A pressure transducer comprising a base, a rotatable shaft journaled at one end into the base, a pressure-responsive tube formed in a flat spiral having a plurality of turns disposed concentrically around the shaft, the outer end of the tube being rigidly joined to the base and the inner end of the tube being joined to the rotatable shaft whereby movements of the inner end of the tube responsive to pressure variations produce rotary motion of the shaft, a resistance wire coil held on a support structure joined to the base, and a contact arm joined to the other end of the rotatable shaft and adapted for slidable movement along the resistance wire coil responsive to rotary motion of the shaft.

12. A pressure transducer comprising a base, a pressure-responsive tube formed in a flat spiral having a plurality of turns, one end of the tube being rigidly attached to the base and the other end of the tube being movable in a generally circular direction around the axis of the spiral responsive to pressure variations, a resistance element supported on the base, a contact arm operatively engaged to the other end of the tube for slidable movement along the resistance element directly responsive to movements of the other end of the tube, and means adapted to the contact arm for supporting the other end of the tube to stabilize it against vibration and shock.

References Cited in the file of this patent

UNITED STATES PATENTS

| | | |
|---|---|---|
| 1,398,792 | Paulin | Nov. 29, 1921 |
| 1,953,819 | Payne | Apr. 3, 1934 |
| 2,152,262 | Klein | Mar. 28, 1939 |
| 2,226,629 | Mather | Dec. 31, 1940 |

UNITED STATES PATENT OFFICE

CERTIFICATE OF CORRECTION

Patent No. 2,908,881 October 13, 1959

Edmund W. Pitzer

It is hereby certified that error appears in the printed specification of the above numbered patent requiring correction and that the said Letters Patent should read as corrected below.

Column 5, line 36, for "responsible" read -- responsive --.

Signed and sealed this 22nd day of March 1960.

(SEAL)
Attest:

KARL H. AXLINE
Attesting Officer

ROBERT C. WATSON
Commissioner of Patents